United States Patent
Engesser

(10) Patent No.: US 10,100,661 B2
(45) Date of Patent: Oct. 16, 2018

(54) METHOD FOR OPERATING A GAS TURBINE ARRANGEMENT

(71) Applicant: General Electric Technology GmbH, Baden (CH)

(72) Inventor: Hermann Engesser, Baden-Rutihof (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 67 days.

(21) Appl. No.: 15/050,194

(22) Filed: Feb. 22, 2016

(65) Prior Publication Data

US 2016/0245112 A1  Aug. 25, 2016

(30) Foreign Application Priority Data

Feb. 24, 2015  (EP) ..................................... 15156245

(51) Int. Cl.
*F01D 15/10* (2006.01)
*F01D 13/02* (2006.01)
(Continued)

(52) U.S. Cl.
CPC ............. *F01D 15/10* (2013.01); *F01D 13/02* (2013.01); *F01D 19/00* (2013.01); *F01D 21/00* (2013.01);
(Continued)

(58) Field of Classification Search
CPC ...... F02N 11/08; F02N 11/04; F02N 11/0848; F01D 15/10; F01D 13/02; F01D 19/00;
(Continued)

(56) References Cited

U.S. PATENT DOCUMENTS 2,392,783 A * 1/1946 Stevens ..................... F02C 1/02
137/13
4,043,126 A * 8/1977 Santos ..................... B60K 3/04
137/625.11
(Continued)

FOREIGN PATENT DOCUMENTS

DE  10 2008 062 588 B  6/2010
EP  0 924 410 A1  6/1999
(Continued)

OTHER PUBLICATIONS

Extended European Search Report dated Aug. 27, 2015, issued by the European Patent Office in the corresponding European Patent Application No. 15156245.1-1607. (8 pages).

*Primary Examiner* — Tulsidas C Patel
*Assistant Examiner* — Charles Reid, Jr.
(74) *Attorney, Agent, or Firm* — Buchanan Ingersoll & Rooney PC

(57) ABSTRACT

The invention concerns a method for operating a gas turbine arrangement, wherein the gas turbine arrangement can be actively connected to a grid system and includes a separation of compressor and turbine shaft to operate both components individually as unit. A first unit can include at least one turbine and at least one generator and a second unit can include at least one compressor and least one motor. Various switches are situated along power lines and are actively connected to a frequency converter and/or the grid system, wherein the compressed air duct operating downstream of the compressor includes a flap.

10 Claims, 5 Drawing Sheets

(51) Int. Cl.
| | | |
|---|---|---|
| *F01D 19/00* | (2006.01) | |
| *F01D 21/00* | (2006.01) | |
| *H02K 7/18* | (2006.01) | |
| *H02P 9/04* | (2006.01) | |
| *F02C 6/02* | (2006.01) | |
| *F02C 9/20* | (2006.01) | |
| *F02C 9/28* | (2006.01) | |

(52) U.S. Cl.
CPC ............... *F02C 6/02* (2013.01); *F02C 9/20* (2013.01); *F02C 9/28* (2013.01); *H02K 7/1823* (2013.01); *H02P 9/04* (2013.01); *F05D 2220/60* (2013.01); *F05D 2220/72* (2013.01); *F05D 2220/764* (2013.01); *F05D 2270/101* (2013.01); *F05D 2270/304* (2013.01)

(58) Field of Classification Search
CPC .... F01D 21/00; F02C 6/02; F02C 9/20; F02C 9/28; H02K 7/1823; H02P 9/04
USPC ......................................................... 290/52
See application file for complete search history.

(56) References Cited

U.S. PATENT DOCUMENTS

| | | | | |
|---|---|---|---|---|
| 4,124,978 | A * | 11/1978 | Wagner | F01B 1/04 184/11.5 |
| 4,215,550 | A * | 8/1980 | Dinger | F02B 29/0418 60/605.2 |
| 4,340,820 | A * | 7/1982 | Meyer-Pittroff | F01K 13/006 290/40 R |
| 4,342,201 | A * | 8/1982 | Ishii | B01J 19/0013 62/238.4 |
| 4,481,768 | A * | 11/1984 | Goshorn | G05B 19/44 60/327 |
| 4,586,870 | A * | 5/1986 | Hohlweg | F04D 27/0246 415/1 |
| 5,632,146 | A * | 5/1997 | Foss | F17C 5/007 137/565.16 |
| 5,689,141 | A * | 11/1997 | Kikkawa | F01D 15/10 290/1 R |
| 5,722,229 | A | 3/1998 | Provost | |
| 6,178,735 | B1 | 1/2001 | Frutschi | |
| 6,360,535 | B1 | 3/2002 | Fisher | |
| 8,373,295 | B2 * | 2/2013 | Hoffmann | F01D 15/10 290/52 |
| 8,567,184 | B2 * | 10/2013 | Scotti Del Greco | F02C 1/005 417/323 |
| 2009/0107142 | A1 | 4/2009 | Russell et al. | |
| 2010/0032964 | A1 * | 2/2010 | Hoffmann | F01D 15/10 290/40 B |
| 2010/0154428 | A1 * | 6/2010 | Yu | F01D 23/068 60/772 |
| 2011/0018265 | A1 * | 1/2011 | Hoffmann | F01K 13/02 290/7 |
| 2011/0088669 | A1 | 4/2011 | Russell et al. | |
| 2011/0169278 | A1 * | 7/2011 | Beul | F01D 15/00 290/40 R |
| 2011/0304155 | A1 * | 12/2011 | Hoffmann | F01K 23/10 290/1 R |
| 2011/0304159 | A1 | 12/2011 | Juretzek | |
| 2013/0249213 | A1 | 9/2013 | Oesterheld et al. | |
| 2014/0000270 | A1 | 1/2014 | Döbbeling et al. | |
| 2015/0171705 | A1 * | 6/2015 | Hino | F01D 15/10 290/1 A |

FOREIGN PATENT DOCUMENTS

| | | | |
|---|---|---|---|
| EP | 2 644 839 | A1 | 10/2013 |
| EP | 2 679 786 | A1 | 1/2014 |

\* cited by examiner

METHOD FOR OPERATING A GAS TURBINE ARRANGEMENT

TECHNICAL FIELD

The invention refers to a method for operating a gas turbine arrangement for a flexible and optimized quick start-up and grid compliance. The invention additionally refers to a gas turbine arrangement comprising a separation of compressor and turbine shaft to operate both components individually.

The invention refers to a method for operating a gas turbine arrangement, wherein the gas turbine arrangement being actively connected to a grid system and comprising a separation of compressor and turbine shaft to operate both components individually.

BACKGROUND OF THE INVENTION

EP 924 410 B1 refers to a method for operating a gas turbo-generator set (GT), the caloric potential of the exhaust gases from the gas turbo-generator set (GT) is utilized by guiding them through a heat exchanger which is operatively connected to a hot-air turbo-generator set (LT). A compressor associated with this hot-air turbo-generator set (LT) is operated isothermally by means of point-focused or continuous water injection, and, after expansion has taken place, the injected water is collected by condensation in a separator. A circuit is thus provided, in which the adaptation of assemblies in order to achieve maximized efficiency is avoided. In this respect, a plurality of smaller gas turbines, even of different types, can cooperate with a large hot-air turbine (LT). A plurality of small high-speed hot-air turbines (LT) can also be assigned to a high-power gas turbine. Their super-synchronous rotational speeds can be stabilized, for example, via a converter (frequency converter).

A frequency converter is an electronic or electromechanical device that converts alternating current (AC) of one frequency to alternating current to another frequency. The device may also change the voltage, but if it does, that is incidental to its principal purpose. Aside from the obvious application of converting bulk amounts of power from one distribution standard to another frequency converters are also used to control the speed and the torque of AC motors.

DE 10 2008 062 588 B4 refers to a method for stabilizing the network frequency of an electrical power network is provided. The network includes at least a two-shaft gas turbine which includes power turbine and a gas generator, wherein the power turbine is connected to a first generator by means of a shaft in a torque transferring manner. Also, an assembly for carrying out the method is provided. The first shaft of the power turbine and the first generator turn permanently synchronized with the power network and the first generator drives the rotation as a motor and a second shaft of the gas generator permanently turns at an ignition speed, wherein the gas generator is ignited upon a power demand and the power turbine is driven by the created hot gas of the gas generator, such that the first generator creates power.

SUMMARY OF THE INVENTION

The present invention is based on the object of proposing a method for operating a gas turbine arrangement (GT) with separation of compressor and turbine shaft to operate both components individually, with the following features:

Accordingly, the basic idea consists in the fact that:

A separation of turbine/generator unit from compressor/motor unit is given. Turbine/generator unit is always connected to the grid system, except run-up and shut-down modes. Compressor/motor unit is driven via frequency converter FC with variable speed to fulfill the air mass flow requirements.

Thus, a first unit comprising at least one turbine (T) and at least one generator (G) and a second unit comprising at least one compressor (C) and at least one motor (M), wherein at least one operation mode of at least one unit is directly or indirectly operatively communicating with a frequency converter (FC) and/or with the grid system.

Contrary, existing GT engines need too long start-up and limited grid compliance.

Specifically, the GT is characterized by the following operation modes:

Standstill:
Turbine/generator unit driven by rotor barring;
Compressor/motor unit driven by rotor barring;
Switches S1, S2, S3 (see FIG. 1) are open.

Ready to start mode:
Turbine/generator unit is run to speed n1 via frequency converter, closing switch S2; while switches S1 and S3 are open.
Flap to block air mass flow is open to introduce a slight air mass flow.
Speed n1 is chosen to turn the turbine/generator shaft such that the turbine is heated up via ventilation of blading in the area of 1000 rpm.

Start-up and ignition mode:
Turbine/generator unit is run to nominal speed (grid frequency) and switch S1 is closed, i.e., generator working as motor.
Flap is open and switch S2 is opened.
Compressor/motor unit is driven by frequency converter (FC) by closing switch S3 to speed n2, wherein speed n2 is the ignition speed of the combustor of gas turbine arrangement GT.
Thus, the combustor is ignited.

Loading:
The fuel flow and air mass flow in the required composition is gradually increased by the controller CR via:
The fuel flow is directed by the fuel control valve CV.
The air mass flow of the compressor C is directed by the frequency converter FC and motor M.
Flap is opened.
The generator G is first consuming electrical energy from the grid system and by increasing the thermal power of the combustor, the electrical load consumption will be reduced and the generator will start to export energy to the grid system, i.e., the generator is always connected to the grid system so that no synchronization is needed.

Shut-down:
The thermal power of the combustor is reduced until flame-off.
Control valve CV is closed.
Switch S1 is opened, the turbine shaft is running down and at a standstill rotor barring is started.
Switch S3 is opened, the compressor shaft is quickly running down and at standstill rotor barring is started.
Flap is closed to keep the turbine warm. The point of time to close of the flap shall avoid compressor surge.
In case of keeping ready to start mode, switch S2 is closed and speed n1 is kept.

GT trip:
The fuel flow is stopped by immediate closing of the fuel control valve CV and the trip valve TV.

Simultaneously, switch S3 is opened, the compressor shaft is quickly running down.

As soon as the generator consumes energy, switch S1 is opened and the turbine shaft is running down.

Flap is closed to keep the turbine warm; the point of time to close of the flap shall avoid compressor surge.

S2 is closed and speed n1 is kept to keep the turbine on ready to start mode.

Accordingly, the advantages associated with this invention compared to the state of the art are as follows:

- No variable inlet guide vane (VIGV), no blow-off valves (BOV), compressor driven to avoid surge independent of grid frequency;
- Quick start-up, no HRSG (Heat Recovery Steam Generator) purge if GT is combined with HRSG;
- In combination with HRSG the slow starting steam turbine can be connected via clutch;
- Pre-warming of turbine via blade ventilation driven by generator;
- Maximum quick start-up of compressor/motor unit (low inertia);
- No synchronization and idle speed operation;
- No GT shut-down in case of grid frequency drop;
- Frequency control is always possible without any limitations since the compressor is driven by frequency converter.

Particular advantages are obtained, when retrofitting existing installations, thus making it possible to react quickly to changing markets.

A further advantageous development of the invention can be provided for the turbine T and the generator G to be associated with a steam power station (not seen) which has a central control system which controls the gas turbine and the steam power station, and which control system causes initiation of the gas generator when there is a power demand on the steam power station which exceeds a specific limit. This development is particularly advantageous because, for example, it is possible to save or replace conventionally costly reserve provision mechanisms in the steam power station.

BRIEF DESCRIPTION OF THE DRAWINGS

The invention will be described in more detail in the following text using one specific exemplary embodiment and with reference to a drawing for illustrative purposes. For a person skilled in the art, these statements will result in additional possible ways to implement the invention which may differ from the specific exemplary embodiment. In the Figures.

DETAILED DESCRIPTION OF DIFFERENT EMBODIMENTS OF THE INVENTION

Figure 1:
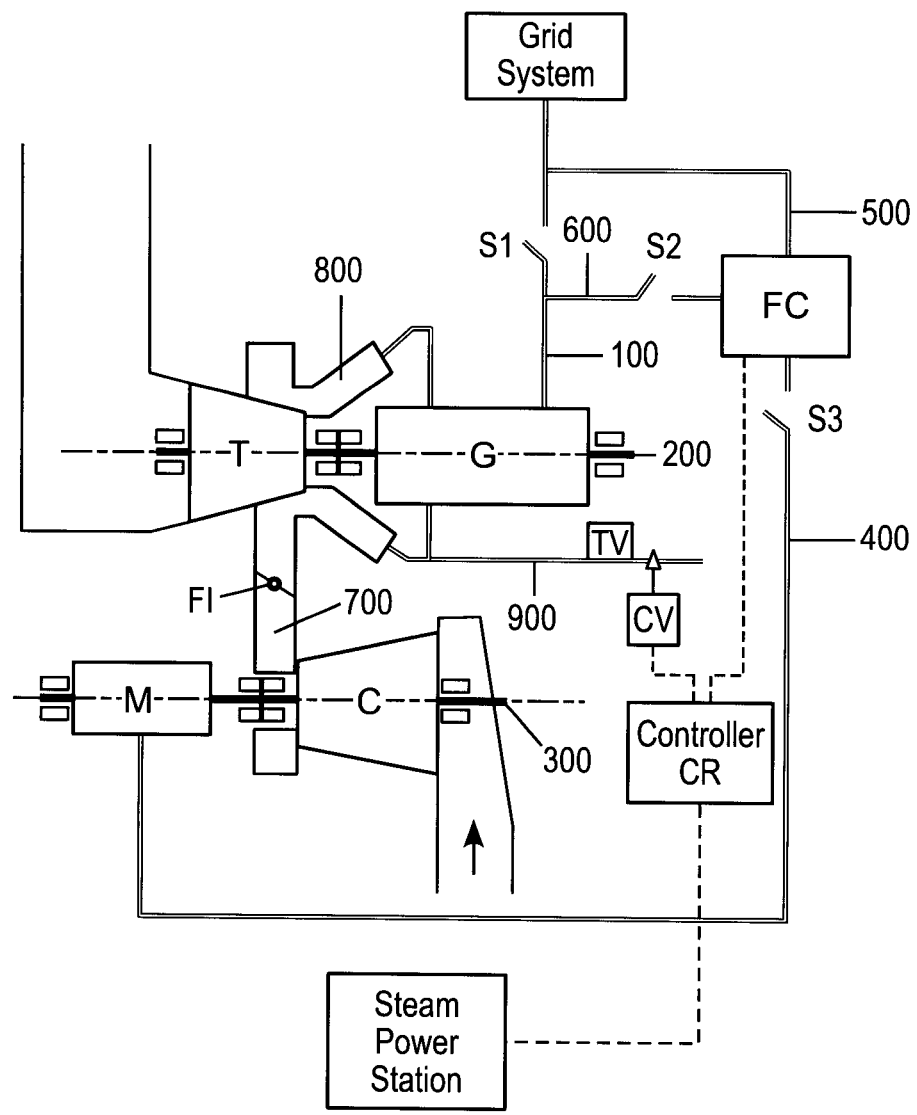
FIG. 1 shows an arrangement of a gas turbine engine, wherein the arrangement comprising a separation of compressor and turbine shaft to operate both components individually.

FIG. 1 shows a gas turbine arrangement comprising fundamentally a separation of turbine T/generator G unit from compressor C/motor M unit. Turbine/generator unit T/G is always connected to the grid system via a power line 100, except run-up and shut-down modes (see also FIG. 6). Turbine/generator unit T/G driven by T/G shaft 200, and compressor/motor unit C/M driven by C/M shaft 300. In operative connection with the frequency converter FC three switches S1, S2, S3 are provided, wherein the switch S1 is located along the power line 100, downstream of the switch S2, wherein the switch S2 is arranged along the power line 600, which extending between frequency converter FC and power line 100. The power line 500 operates between frequency converter FC and grid system or vice versa. The switch S3 is arranged downstream of the frequency converter FC toward the motor M along the power line 400. In the air duct 700 downstream of the compressor C a flap Fl is arranged, which regulates the compressed mass flow directed to the combustor 800 upstream of the turbine T. At the beginning the fuel control valve CV is closed. Basically, the fuel flow within the fuel distribution system 900 and air mass flow in the required composition are gradually increased by the controller CR. The fuel flow directed by the fuel control valve CV and the air mass flow of the compressor C directed by the frequency converter FC and motor M.

Figure 2:
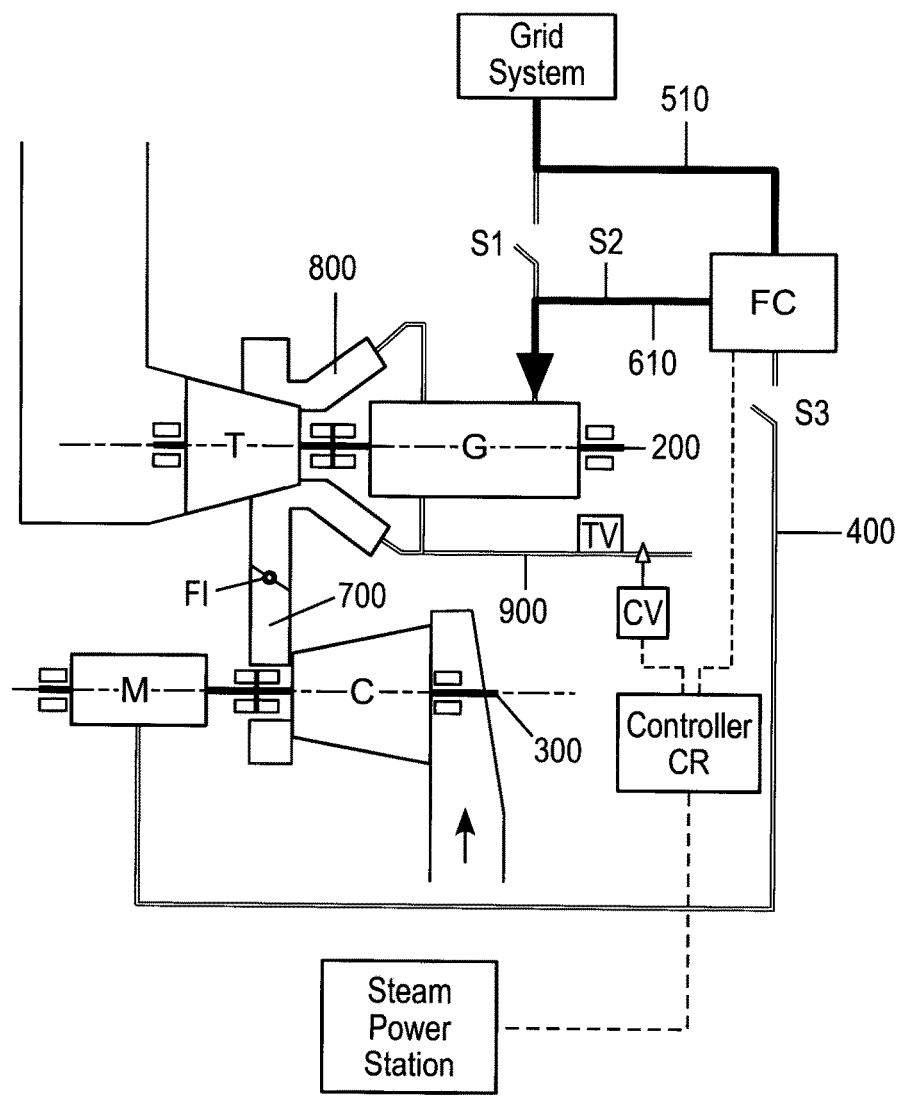
FIG. 2 shows the operation method referring to ready-to-start mode.

FIG. 2 shows a gas turbine arrangement comprising fundamentally a separation of turbine T/generator G unit from compressor C/motor M unit, wherein this operation method referring to ready-to-start mode. Turbine/generator unit T/G is run to speed n1 via frequency converter FC; in this state, switch S2 is closed (see power line 610); while switches S1 and S3 are open. Flap Fl to block air mass flow is open to introduce a slight air mass flow. Speed n1 is chosen to turn the turbine/generator shaft 200 such that the turbine is heated up via ventilation of blading in the area of 1000 rpm. This arrangement corresponds then to that in FIG. 1.

Figure 3:
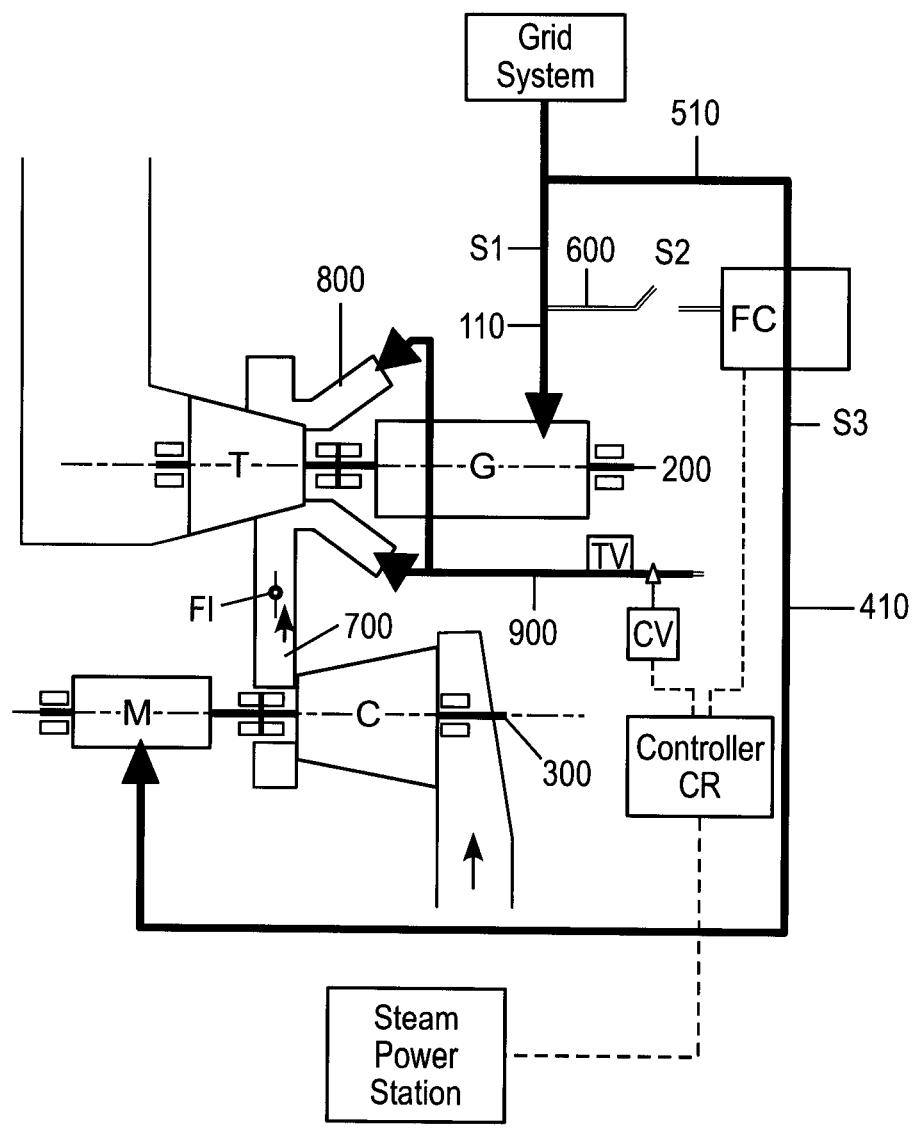
FIG. 3 shows the operation method referring to start-up and ignition mode.

FIG. 3 shows a gas turbine arrangement comprising fundamentally a separation of turbine T/generator G unit from compressor C/motor M unit, wherein this operation method referring to start-up and ignition mode. Turbine/generator unit T/G is run to nominal speed (grid frequency) and switch S1 is closed (see power line 110 from grid system to generator G), i.e., generator G working as motor. Switch S2 is opened (see power line 600), and flap Fl is open. Compressor/motor unit C/M is driven by frequency converter FC by closing switch S3 (see power line 410 from grid system to frequency converter FC and forwards to the motor M) to speed n2, wherein speed n2 is the ignition speed of the combustor of GT. Thus, the combustor is ignited. Beyond that this arrangement corresponds then to that in FIGS. 1 and 2.

Figure 4:
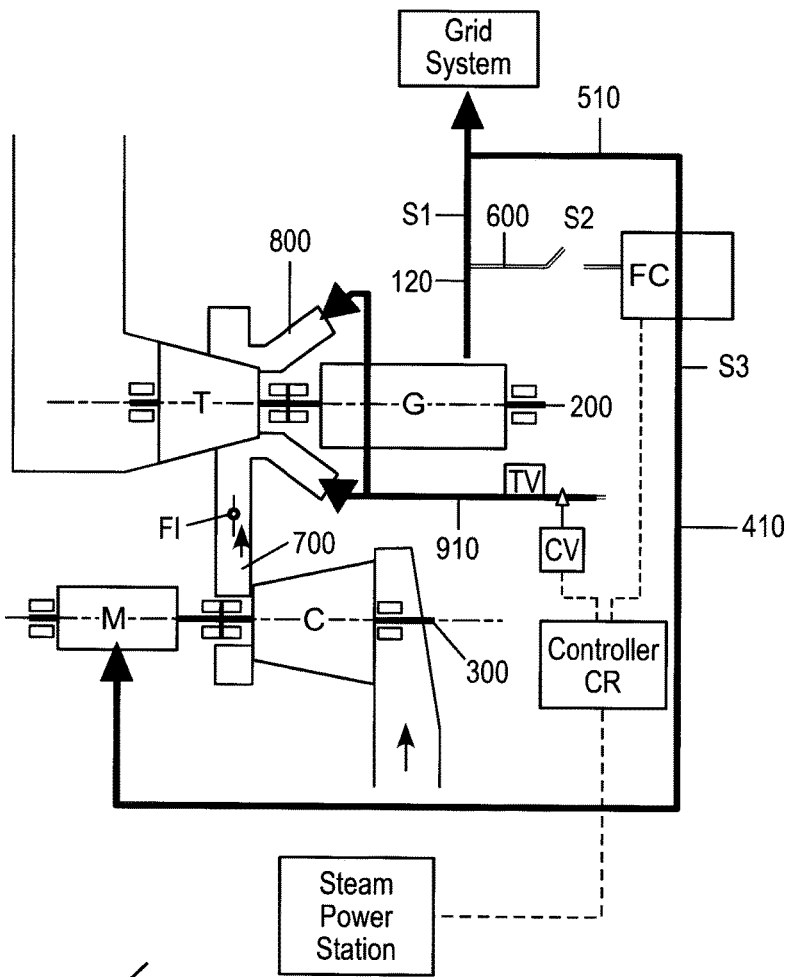
FIG. 4 shows the operation method referring to loading mode.

FIG. 4 shows a gas turbine arrangement comprising fundamentally a separation of turbine T/generator G unit from compressor C/motor M unit, wherein this operation method referring to loading mode. The fuel flow and air mass flow in the required composition is gradually increased by the controller CR via: The fuel flow 910 directed by the fuel control valve CV. The air mass flow of the compressor C directed by the frequency converter FC and motor M and flap Fl is open. The generator G is first consuming electrical energy from the grid system and by increasing the thermal power of the combustor, the electrical load consumption will be reduced and the generator will start to export energy, i.e. the generator is always connected to the grid system so that no synchronization is needed. Switch S2 is opened (see power line 600). Switch S1 is closed (see power line 120 from generator G to grid system). Switch S3 is closed (see power line 410 from grid system to frequency converter FC and forwards to the motor M).

Figure 5:
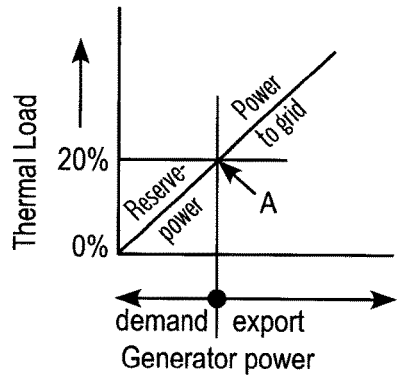
FIG. 5 shows a graphic on the relationship between thermal load and demand/export generator power.

FIG. 5 shows a graphic on the relationship between thermal load and demand/export generator power. The ordinate shows a percentage scale referring to the thermal load of the gas turbine arrangement. The abscissa symbolizes generator power in the division between demand and export. At the intersection with 20% thermal load with respect to the subdivision demand/export (the consumed compressor power to run the turbine T/generator G unit self-sustaining is in the range of 20% full load thermal power on nominal speed), reflects in point A the two states, namely Reverse Power and Power to the Grid.

Figure 6:
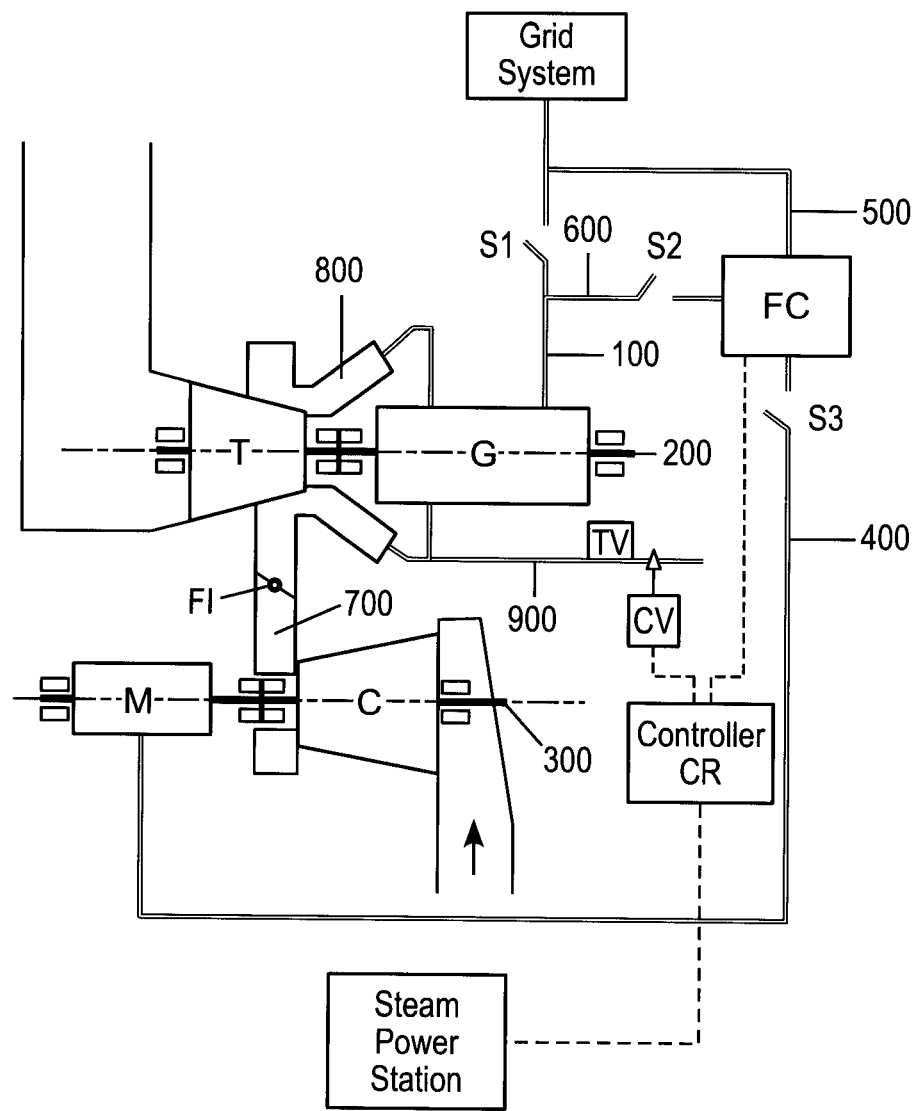
FIG. 6 shows the operational method referring to shut-down mode.

FIG. 6 shows a gas turbine arrangement comprising fundamentally a separation of turbine T/generator G unit from compressor C/motor M unit, wherein this operation method referring to a shout-down mode. The thermal power of the combustor is reduced until flame-off. Fuel control valve CV is closed. Switch S1 is opened, the turbine shaft is running down and at standstill rotor barring is started. Switch S3 is opened, the compressor shaft is quickly running down and at standstill rotor barring is started. Flap Fl is closed to keep the turbine warm. The point of time to close of the flap shall avoid compressor surge. In case of keeping ready to start mode, the opened switch S2 is closed and speed n1 is kept.

LIST OF DESIGNATIONS

T Turbine
C Compressor
G Generator
M Motor
FC Frequency converter
CV Fuel control valve
CR Controller
S1 Switch, first switch
S2 Switch, second switch
S3 Switch, third switch
Fl Flap to block air mass flow
100 Power line
110 Power line (to Generator)
120 Power line (from Generator)
200 T/G shaft
300 C/M shaft
400 Power line
410 Power line (to Motor)
500 Power line
510 Power line (from FC to grid system)
600 Power line
610 Power line (from FC to G)
700 Duct air flow mass, compressed air
800 Combustor
900 Fuel distribution system
910 Fuel flow

The invention claimed is:

1. A method for operating a gas turbine arrangement connected to a grid system, the method comprising:
    separating a compressor and a turbine including a combustor to rotate on separate shafts to operate both components individually, wherein a first unit includes the turbine and at least one generator and a second unit includes the compressor and at least one motor, wherein a first switch, a second switch and a third switch are situated along respective first, second and third power lines and are connected to a frequency converter and the grid system; and
    introducing an air mass flow from the compressor to the combustor of the turbine via a compressed air duct including a flap operating downstream of the compressor.

2. The method according to claim 1, wherein the first switch is arranged along the first power line arranged between the generator and the grid system or vice versa, the second switch is arranged along the second power line which operates between the first power line and the frequency converter or vice versa, the third switch is arranged along the third power line which operates between the motor and the frequency converter or vice versa, and wherein a fourth power line operates between the frequency converter and the grid system or vice versa.

3. The method according to claim 1, wherein operating of the gas turbine arrangement refers to at least one or a sequential process or a variable combination of the following modes:
    a standstill mode;
    a ready-to-start mode;
    a start-up and ignition mode;
    a loading mode;
    a shut-down mode; and/or
    a gas turbine trip mode.

4. The method according to claim 3, the standstill mode comprising:
    driving the first unit by a rotor barring;
    driving the second unit by a rotor barring;
    opening the first, second and third switches; and
    closing the flap.

5. The method according to claim 3, the ready-to-start mode comprising:
    driving the first unit by a rotor barring;
    driving the second unit by a rotor barring;
    running the first unit to a speed via the fourth power line from the grid system to the frequency converter;
    closing the second switch arranged along the second power line, while the first switch and the third switch remain opened;
    opening the flap for introducing the air mass flow from the compressor to the combustor to introduce a slight air mass flow;
    choosing a speed to turn the turbine/generator shaft such that the turbine is heated up via ventilation of blades of the turbine in the area of 1000 rpm.

6. The method according to claim 3, the start-up and ignition mode comprising:
    driving the first unit by a rotor barring;
    driving the second unit by a rotor barring;
    running the first unit to nominal speed corresponding to a grid frequency;
    closing the first switch arranged along the first power line, such that the generator operates as a motor;
    opening the second switch;
    opening the flap; and
    driving the second unit to a speed n2 via the third power line by the frequency converter by closing the third switch, wherein speed n2 corresponds to an ignition speed of the combustor of the gas turbine arrangement.

7. The method according to claim 3, the loading mode comprising:
    driving the first unit by a rotor barring;
    driving the second unit by a rotor barring;
    gradually increasing a fuel flow and a compressed air mass flow in a composition by a controller wherein
    a) the fuel flow is directed by a fuel control valve;

b) the compressed air mass flow is directed by the frequency converter;

c) the flap is opened; and driving the second unit by the frequency converter by closing the third switch, wherein the generator is first consuming electrical energy from the grid system and by increasing a thermal power of the combustor, an electrical load consumption is reduced and the generator starts to export energy via a power line by closing the first switch, wherein the generator is always connected to the grid system in such a way that no re-synchronization is needed.

8. The method according to claim 3, the shut-down mode comprising:

driving the first unit by a rotor barring;

driving the second unit by a rotor barring;

reducing a thermal power of the combustor until no combustion process is present in the combustor;

closing a control valve;

opening the first switch, wherein a turbine/generator shaft is slowing down and when stopped the rotor barring driving the first unit is started, wherein the third switch is opened and a compressor/motor unit shaft is quickly running down and at standstill, the rotor barring driving the second unit is started;

closing the flap to keep the turbine warm, wherein in keeping ready to start mode an opened second switch is closed and a speed n1 is kept.

9. The method according to claim 3, the gas turbine trip mode comprising:

driving the first unit by a rotor barring;

driving the second unit by a rotor barring;

stopping a fuel flow by immediate closing of a fuel control valve and a trip valve;

simultaneously opening the third switch and a compressor/motor unit shaft is slowing down, wherein as soon as the generator consumes energy, opening the first switch and a turbine/generator unit shaft is slowing down, closing the flap to keep the turbine warm and a point of time to close of the flap avoids a compressor surge, closing an opened second switch and keeping a speed n1 to keep the turbine on ready to start mode.

10. The method according to claim 1, wherein the turbine and the generator are associated with a steam power station which has a controller which controls the gas turbine and the steam power station, and which controller causes initiation of the generator when there is a power demand on the steam power station which exceeds a specific limit.

* * * * *